United States Patent
Newman et al.

(10) Patent No.: US 6,889,705 B2
(45) Date of Patent: May 10, 2005

(54) ELECTROMAGNETIC VALVE FOR REGULATION OF A FUEL FLOW

(75) Inventors: Paul Newman, Calgary (CA); Dale Ulan, Calgary (CA)

(73) Assignee: Alternative Fuel Systems, Inc., Calgary (CA)

( * ) Notice: Subject to any disclaimer, the term of this patent is extended or adjusted under 35 U.S.C. 154(b) by 222 days.

(21) Appl. No.: 10/062,457

(22) Filed: Feb. 5, 2002

(65) Prior Publication Data

US 2003/0145890 A1 Aug. 7, 2003

(51) Int. Cl.[7] .................................................. G05D 7/06
(52) U.S. Cl. ..................... 137/487.5; 137/486
(58) Field of Search .............................. 137/487.5, 487, 137/486, 485, 553, 554

(56) References Cited

U.S. PATENT DOCUMENTS 6,152,162 A * 11/2000 Balazy et al. ............ 137/486 X
6,539,315 B1 * 3/2003 Adams et al. ......... 137/487.5 X
2002/0174899 A1 * 11/2002 Adams et al. ............ 137/487.5

* cited by examiner

Primary Examiner—Kevin Lee
(74) Attorney, Agent, or Firm—I. Zborovsky

(57) ABSTRACT

A fuel flow regulating valve installable on a fuel flow line between a fuel flow inlet and a fuel flow outlet and movable between an open position in which it allows a continuous flow of fuel from the fuel flow inlet to the fuel flow outlet through the line and a closed position in which it interrupts the flow of fuel, an electromagnetic actuator connected with the regulating valve and actuating the latter so as to adjust an opening degree of the regulating valve, and a control unit for controlling the electromagnetic actuator in dependence on at least one parameter of the fuel flow so as to correspondingly adjust the opening degree of the regulating valve.

13 Claims, 3 Drawing Sheets

ELECTROMAGNETIC VALVE FOR REGULATION OF A FUEL FLOW

BACKGROUND OF THE INVENTION

The present invention relates to fuel flow regulating valves for regulating a fuel flow.

Such regulating valves are well known in the art. One of such fuel flow regulating valves is disclosed for example in the SRC publication no. 11305-5DO1 "An Electronic Regulator for Automotive Gaseous Fuels Applications", S. Hill, M. Sulatisky, K. Young of Saskatchewan Research Concept, and H. Portman, U. Imhof of Dynetek Industries LTD, Canada. The electronic pressure regulator is based on a pilot-operated principle and uses an on/off high-speed solenoid valve for fuel metering. Electronic diesel and gasoline pressure regulators are normally bypass regulators where the exiting fuel is returned to the fuel tank. Since this is not possible in hydrogen or natural gas fuel systems, because the fuel tank is at a higher pressure than the regulator outlet pressure, it is desirable to regulate the inlet of the fuel metering system. Some diesel and gasoline pressure regulating systems throttle or otherwise control a high pressure pump. However, they need a pump to raise a fuel pressure to the pressure stored in an accumulator or fuel rail. This is not an option for gaseous fuel stored under high pressure, such as hydrogen or natural gas. Electronic air pressure regulators have been also used for various applications. However, they are allowed to vent excessive pressure to the atmosphere. Since the working fluid of this pressure regulator may be a combustible fuel, venting excessive working fluid (fuel) is not an option.

SUMMARY OF THE INVENTION

Accordingly, it is an object of present invention to provide an electronic pressure regulator which avoids the disadvantages of the prior art.

In keeping with these objects and with others which will become apparent hereinafter, one feature of the present invention resides, briefly stated, in a fuel flow regulating valve installable on a fuel flow line between a fuel flow inlet and a fuel flow outlet and movable between an open position in which it allows a continuous flow of fuel from the fuel flow inlet to the fuel flow outlet through the line and a closed position in which it interrupts the flow of fuel; an electromagnetic actuator connected with said regulating valve and actuating the latter so as to continuously adjust an opening degree of said regulating valve; and control means for controlling said electromagnetic actuator in dependence on at least one parameter of the fuel flow so as to correspondingly adjust the opening degree of said regulating valve.

When the electronic fuel flow regulator is designed in accordance with the present invention, it eliminates the disadvantages of the prior art.

In accordance with other novel features of the present invention, the control means receives signals from sensing means for sensing an outlet fuel pressure after the regulating valve, and/or from sensing means for sensing an inlet fuel pressure before the regulating valve, and/or from means for sensing a displacement of a valve member of the regulating valve, so as to generate corresponding signals to the electromagnetic actuator and to correspondingly adjust the opening degree of the regulating valve.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
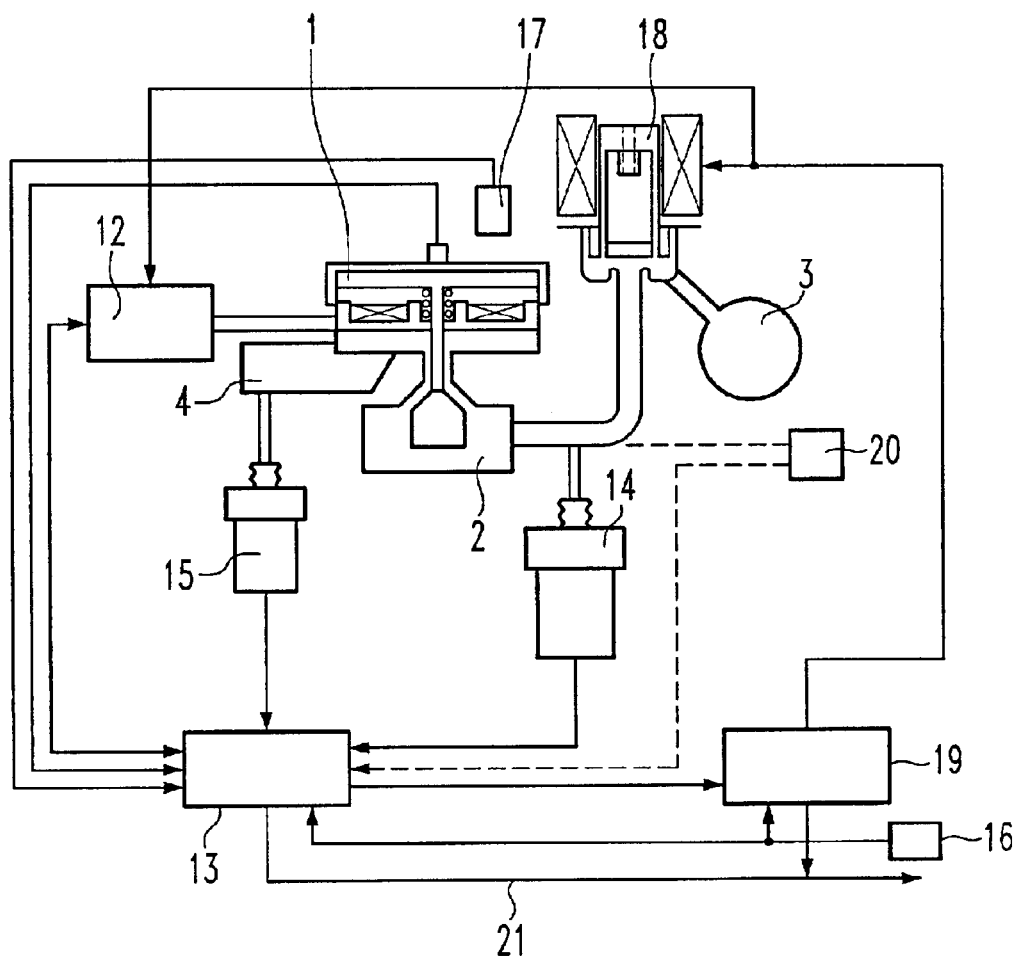
FIG. 1 is a view schematically showing a fuel flow regulating valve in accordance with the present invention.
Figure 2:
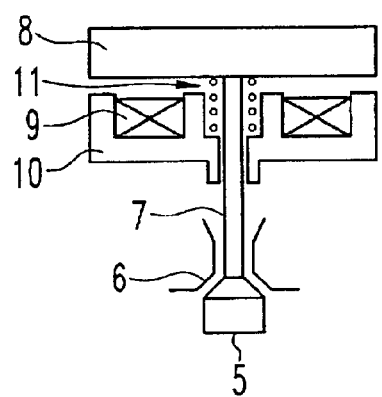
FIG. 2 is a view schematically showing a regulating valve of the inventive fuel flow regulating valve.

A fuel flow pressure regulator in accordance with the present invention has a regulating valve for regulating a flow of fluid such as fuel, which is identified with reference numeral 1. The regulating valve 1 is arranged on a fuel flow line 2 which extends between a fuel flow inlet 3 and a fuel flow outlet 4. The function of the regulating valve is to open the fuel line 2 so as to allow a continuous flow on fuel from the fuel flow inlet 3 to the fuel flow outlet 4, and to close the fuel line 2 so as to prevent the flow of fuel. For this purpose the regulating valve has a valve member formed as a valve pintle 5 and cooperating with a valve seat 6 so as to close and to open the regulating valve.

The valve pintle 5 is arranged on one end of a connecting rod 6 with an opposite end connected to an armature 8. A coil 9 is arranged in a pole piece 10 and, when supplied with electric power, attracts the armature so as to move the valve pintle 5 to an open position. A spring 11 biases the armature 8 upwardly in the drawing, so as to move the valve pintle 5 to the closed position.

The regulating valve 1 is a proportional flow valve. It may be of a poppet type, which is the most common type used in automotive pressure regulation. The valve may be either balanced or unbalanced, depending on the required flow rate and minimum and maximum pressure differentials. However, any other mechanical valve may be used in the present invention as well.

The electronic signal is supplied to the coil 9 by an actuator driver 12. The electromagnetic actuator is a high efficiency actuator and sends electronic signals to the coil of the regulating valve to provide a corresponding operation of the regulating valve, in particular for changing the opening degree of the regulating valve 1. The actuator driver 12 is connected with control means 13 and receives control signals from the control means.

The control means 13 represent an electronic controller which operates depending on corresponding parameters. It may be formed as an analog and/or a digital controller, depending on performance, size and cost targets. It can include also safety monitoring and protection features.

The fuel flow pressure regulator in accordance with the present invention further has a high pressure sensor identified with reference numeral 14 and a low pressure sensor identified with reference numeral 15. The high pressure sensor 14 is connected with the fuel flow line 2 at the side of the inlet 3, while the low pressure sensor 15 is connected with the fuel flow line 2 at the side of its outlet 4, so as to sense the pressure of the fuel flowing to the regulating valve 1 and the pressure of the fuel discharged from the regulating valve 1. The outlets of the high pressure sensor 14 and the low pressure sensor 15 are connected to the control means 13. Means are further provided for supplying to the control means 13 a signal corresponding to a set point pressure, as identified with reference numeral 16.

In operation of the regulator in accordance with the present invention, a signal corresponding to the outlet pressure measured by the low pressure sensor 15 and a signal corresponding to the set point pressure are supplied to the control means 13 and compared in it. Based on this comparison, a signal is supplied by the control means 13 to the electromagnetic actuator 12, which in turn supplies a corresponding electronic signal to the regulating valve 1 and controls the latter respectively, for adjusting a degree of opening of the regulating valve 1. In order to maximize the performance of the regulator and minimize the possibility of instability, a signal corresponding to the inlet pressure sensed by the high pressure sensor 14 can be also supplied to the control means 13.

In accordance with still a further feature of the present invention means are provided for sensing an exact position of the pintle 5 of the regulating valve 1 and supplying a corresponding signal to the control means 13. This means can be formed as a displacement sensing transducer 17 which is connected to the control means 13 and supplies its signal to the latter. The control means 13 therefore takes into consideration the position of the pintle 5, by sensing the position of the rod 7 which holds the pintle 5, for thereafter correspondingly controlling the opening degree of the regulating valve 1. This can be used for more accurate pressure control (less overshoot or undershoot), fast response and wear compensation, as well as enhanced self diagnostic capability. This feature allows detection of oscillation or other undesirable operating modes, and allows active correction of them by an on-board controller.

The fuel flow pressure regulator in accordance with the present invention further has a high pressure shut off valve identified with reference numeral 18. The high pressure shutoff valve is used for shutting off the regulating valve and preventing excessive wear and tear of the latter. In the event of a high pressure a diagnostic monitor 19 sends a signal to the high pressure shut off valve 18, and a latter reverts the pintle 5 of the regulating valve 1 to its closed position, with a bubble-tight seal because of significant spring biasing.

The fuel flow regulator further has a pressure relief valve which is identified with reference numeral 20. The pressure relief valve 20 is connected with the control means 13, so that when the control means 13 detect a release of the pressure relief valve it stores data related thereto and sets a diagnostic mode with the use of the diagnostic monitor 19 and also alerts the driver through a diagnostic information line 21 alerting the driver through a check engine light. The pressure relief valve is used in case of malfunctions of the regulating valve 1 or the control means 13, to simply vent high-pressure gas to the atmosphere.

All of the sensor signals in the inventive fuel flow regulator can be monitored by the engine management unit and/or diagnostic tools.

In medium to high flow operations, the regulating valve can operate in a throttling mode when the valve does not close at all. This is the most desirable operating mode as it reduces wear of the valve assembly. During low flow operation, the valve may not be able to throttle the gas sufficiently and the regulator valve will oscillate just around the shut off point of the valve transfer function. Due to the non linear nature of the valve at this point, the valve will operate in a limit-cycle oscillation mode.

Figure 3:
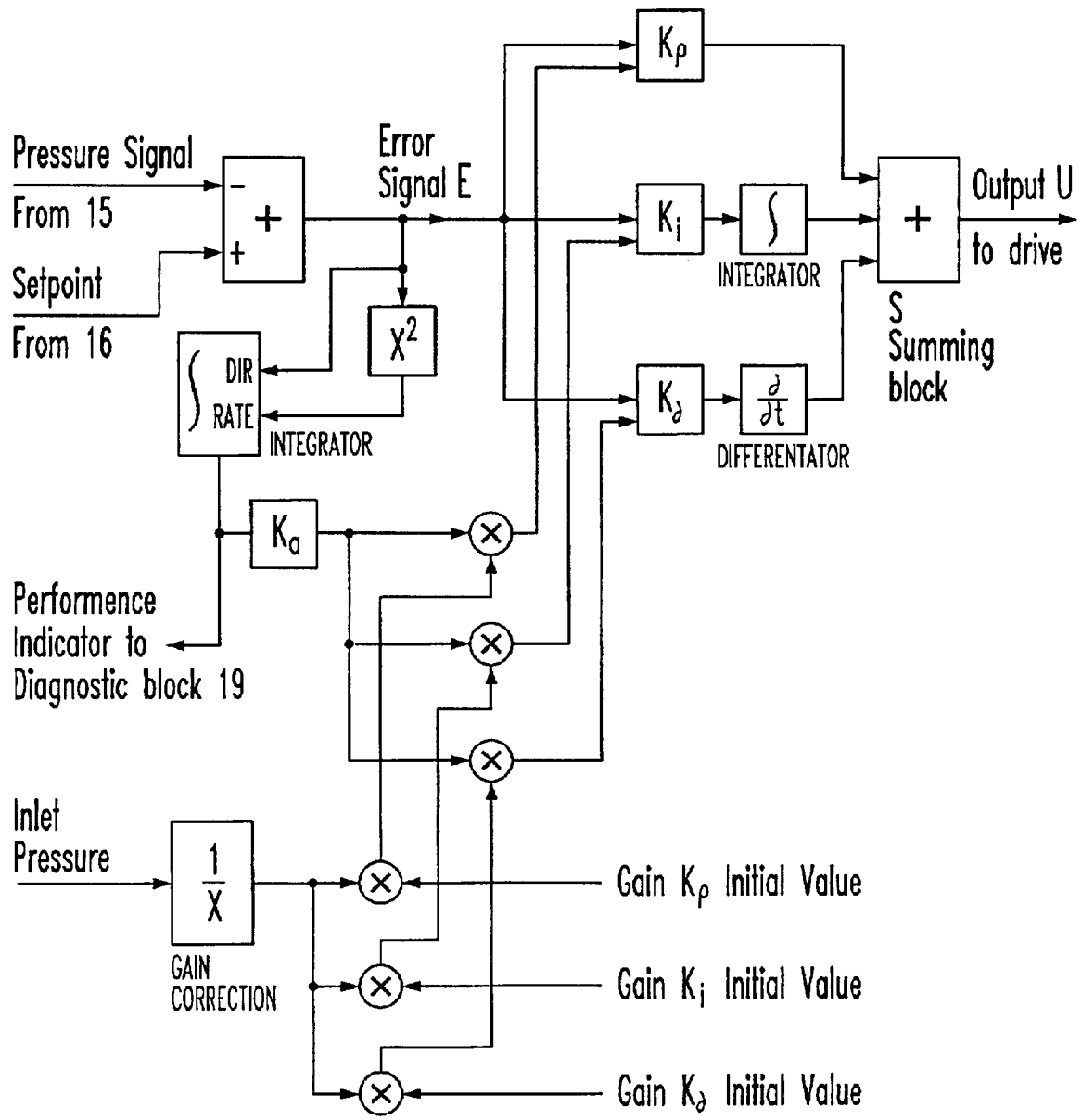
FIG. 3 is a view schematically showing a basic pressure regulator composed of loop in accordance with the present invention.

FIG. 3 illustrates a basic pressure regulator control loop. The outlet pressure signal generated by the pressure sensor 15 is subtracted from the said point pressure (desired outlet pressure) 19. This signal is then fed to a feedback control block. This block can be one or several types of feedback control blocks used and known in the art. The commonly used proportional-integral-derivative block will be used in this example; however, it is only an exemplary embodiment. This block operates by applying a part of the input error signal E to the control output signal U via a variable gain block $K_P$. This signal is fed to a summing block S. The variable gain block acts to multiply the signal going through it. Another part of the feedback blocks applies the input error signal E through a variable gain block $K_I$ and an integrator. The output of the integrator moves in the direction and speed of the input block, performing a real-time operation of a mathematical integration with respect to time. The output of the integrator is applied to the output signal U via the summing block S. The third part of this standard control block is a differentiator which works by taking a time derivative of the signal (or the rate of change of the signal) and applying it through another gain stage $K_d$. This signal is fed to the output signal U via the summing block S.

Figure 4:
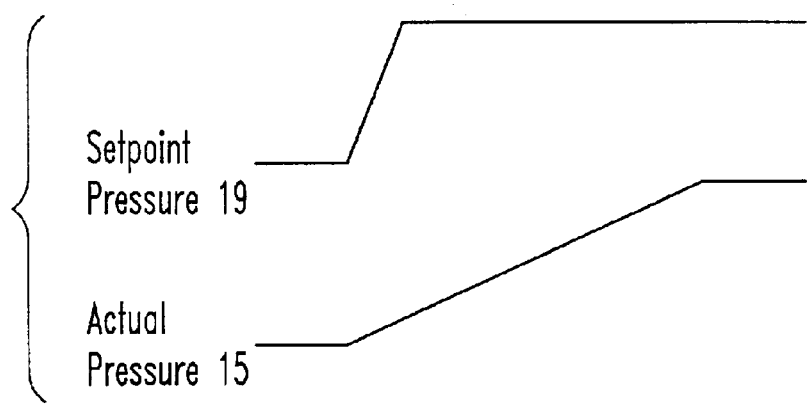
FIGS. 4 and 5 are views illustrating increasing or decreasing of the gains in response to a corresponding error.
Figure 5:
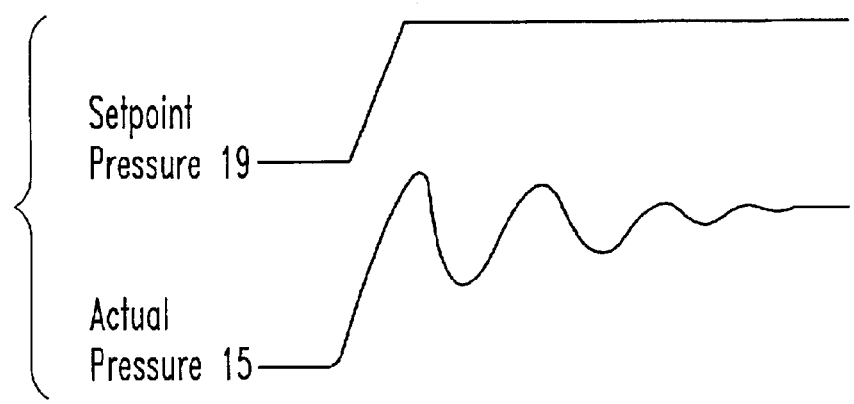

The pressure signal generated by the pressure sensor 15 is monitored for performance. There are several ways of doing this, but a common method involves taking the square of the error signal E from the above block and integrating it via the same logic as used in the above block. This integrating signal can be used to determine if the regulator is responding too slowly or too quickly. A regulator that responds too quickly will tend to oscillate, resulting in excessive noise and wear of the metering valve 1. The performance adjustment would automatically reduce the gains $K_d$ and $K_p$ via another integrator. The output of this integrator is scaled by a gain adjustment factor $K_a$. Direction information is determined from the error direction. If the error is constantly low, the gains should be increased as shown in FIG. 4. If the error is jumping from high to low and back again, the gains should be decreased as shown in FIG. 5. If the error can not be controlled, then the safety monitoring device 19 will force the metering valve 1 closed, and the optional redundant safety valve 18 is closed.

As the inlet pressure can vary, the amount of valve opening required to correct a specific pressure error will also vary. Normally, the amount of required opening increases with a decreasing pressure. This can cause control loop instability in a high inlet pressure condition which can be predicted from this design, and also observed in mechanical pressure regulators which are used currently in the art. The preferred embodiment of this is a calibrated function that utilizes the inlet pressure sensor 14 and its signal to modify the games $K_D$, $K_p$ and $K_I$. These adjustments are made by multiplying the existing gains calculated as in the preceding paragraph.

Figure 6:
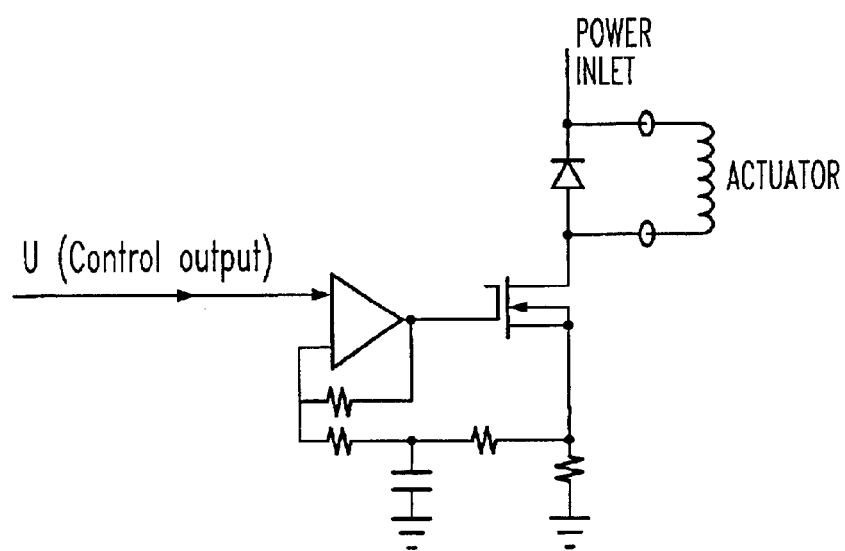
FIG. 6 is a view illustrating a typical design of the actuator drive 12.

It should be mentioned that the actuator driver 12 is simply a power amplifier that is used to interface the control output of the control system 13 to the electromagnetic coil 9 of the actuator. A typical design is shown in FIG. 6. This is only an exemplary embodiment, and of course it can be designed differently as well.

Since the inventive regulator is operative for performing many functions electronically, external electronic modules can interface with the regulator. Said points and gain adjustments described herein above can be communicated from an engine control module to the regulator control system 13 and the regulator setpoint input 16. Also, performance adjustments described herein above, may be communicated to the engine control module and used for internal calculations of the engine controller and also to inform the driver of a problem or potential problem that may need to be repaired. This is another important feature of the present invention that is a part of the preferred embodiment, namely the integration with existing engine control systems.

It will be understood that each of the elements described above, or two or more together, may also find a useful application in other types of constructions differing from the types described above.

While the invention has been illustrated and described as embodied in electromagnetic valve for regulation of a fuel flow, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A fuel flow regulating valve installable on a fuel flow line between a fuel flow inlet and a fuel flow outlet and movable between an open position in which it allows a continuous flow of fuel from the fuel flow inlet to the fuel flow outlet through the line and a closed position in which it interrupts the flow of fuel; an electromagnetic actuator connected with said regulating valve and actuating the latter so as to continuously adjust an opening degree of said regulating valve; and control means for controlling said electromagnetic actuator in dependence on at least one parameter of the fuel flow so as to correspondingly continuously adjust the opening degree of said regulating valve.

2. A fuel flow regulating valve as defined in claim 1; and further comprising means for sensing an outlet pressure of the fuel flow discharged from said fuel flow outlet; and means for providing a set point of the fuel pressure, said means for sensing an outlet pressure and said means for providing said set point fuel pressure being connected to said control means, so that said control means control said electromagnetic actuator depending on signals supplied by said means for sensing the outlet pressure and said means for providing the set point pressure.

3. A fuel flow regulating valve as defined in claim 2; and further comprising means for sensing an inlet pressure of the fuel flow before said pressure regulating valve, said means for sensing said inlet pressure being connected to said control means so that said control means receives a signal from said means for sensing the inlet pressure and activates said electromagnetic actuator for correspondingly controlling said regulating valve.

4. A fuel flow regulating valve as defined in claim 1, wherein said regulating valve has a valve member movable to a plurality of positions between an open position and a closed position for moving said regulating valve continuously between said open position and said closed position of said regulating valve; and further comprising means for sensing a displacement of said valve member, said displacement sensing means being connected to said control means, so that said control means receive a signal from said displacement sensing means to provide a corresponding control of said regulating valve.

5. A fuel flow regulating valve as defined in claim 2, wherein said regulating valve has a valve member movable to a plurality of positions between an open position and a closed position for moving said regulating valve continuously between said open position and said closed position of said regulating valve; and further comprising means for sensing a displacement of said valve member, said displacement sensing means being connected to said control means, so that said control means receive a signal from said displacement sensing means to provide a corresponding control of said regulating valve.

6. A fuel flow regulating valve as defined in claim 3, wherein said regulating valve has a valve member movable between an open position and a closed position for moving said regulating valve between said open position and said closed position of said regulating valve; and further comprising means for sensing a displacement of said valve member, said displacement sensing means being connected to said control means, so that said control means receive a signal from said displacement sensing means to provide a corresponding control of said regulating valve.

7. A fuel flow regulating valve as defined in claim 1; and further comprising diagnostic information providing means connected with said control means and supplying a diagnostic information to a user.

8. A fuel flow regulating valve as defined in claim 1, wherein said regulating valve is formed as an electromagnetic valve including a valve member displaceable to a plurality of positions between an open position and a closed position so as to move said regulating valve continuously between said open position and said closed position of said regulating valve, and electromagnetic means for receiving a signal from said electromagnetic actuator and displacing said valve member to said open position.

9. A fuel flow regulating valve as defined in claim 8, wherein said regulating valve has spring means urging said valve member to said closed position and counteracting a force of said electromagnetic means which displace said valve member to said open position.

10. A fuel flow regulating valve installable on a fuel flow line between a fuel flow inlet and a fuel flow outlet and movable between an open position in which it allows a continuous flow of fuel from the fuel flow inlet to the fuel flow outlet through the line and a closed position in which it interrupts the flow of fuel; an electromagnetic actuator connected with said regulating valve and actuating the latter so as to adjust an opening degree of said regulating valve; and control means for controlling said electromagnetic actuator in dependence on at least one parameter of the fuel flow so as to correspondingly adjust the opening degree of said regulating valve; and comprising a high pressure shut off valve for shutting off said regulating valve depending on a required fuel flow parameter.

11. A fuel flow regulating valve as defined in claim 10, wherein said pressure regulating valve has a valve member movable between an open position and closed position for correspondingly moving said regulating valve between said open and closed positions of said regulating valve, said high pressure shutoff valve being connected with said pressure regulating valve and acting on said valve member of said regulating valve.

12. A fuel flow regulating valve installable on a fuel flow line between a fuel flow inlet and a fuel flow outlet and movable between an open position in which it allows a continuous flow of fuel from the fuel flow inlet to the fuel flow outlet through the line and a closed position in which it interrupts the flow of fuel; an electromagnetic actuator connected with said regulating valve and actuating the latter so as to adjust an opening degree of said regulating valve; and control means for controlling said electromagnetic actuator in dependence on at least one parameter of the fuel flow so as to correspondingly adjust the opening degree of said regulating valve; and comprising an overpressure relief valve for venting a fuel flow to an atmosphere in case of malfunctioning of one of said regulating valve, said electromagnetic actuator and said control means.

13. A fuel flow regulating valve as defined in claim 11, and further comprising diagnosing monitoring means connected with said control means and acting on said high pressure shutoff valve depending on a signal from said control means.

* * * * *